United States Patent [19]

Anderson et al.

[11] 3,859,725

[45] Jan. 14, 1975

[54] CARPET CUTTING TOOL

[76] Inventors: Lloyd E. Anderson, 3123 Upton Ave., North, Minneapolis, Minn. 55412; Gilbert L. Alinder, 5312 Shoreview Ave., South, Minneapolis, Minn. 55417

[22] Filed: Jan. 8, 1973

[21] Appl. No.: 321,774

[52] U.S. Cl. ................................................. 30/294
[51] Int. Cl. .............................................. B26b 3/08
[58] Field of Search ............. 30/286, 293, 294, 289

[56] References Cited
UNITED STATES PATENTS

| 625,550 | 5/1899 | Geisendorf | 30/294 |
| 2,483,092 | 9/1949 | Hanke | 30/294 |
| 2,603,866 | 7/1952 | Rice | 30/294 |
| 3,009,247 | 11/1961 | Mueller | 30/294 |
| 3,543,400 | 12/1970 | Scott | 30/294 |

FOREIGN PATENTS OR APPLICATIONS

| 965,628 | 2/1950 | France | 30/294 |

Primary Examiner—Al Lawrence Smith
Assistant Examiner—J. C. Peters
Attorney, Agent, or Firm—Schroeder Siegfried Ryan & Vidas

[57] ABSTRACT

A manually operated carpet cutting tool wherein a pair of spaced carpet receiving jaw members have transversely extending therebetween a cutting blade having its cutting edge sloping rearwardly and being held at its rearward edge in a slot provided in a pile comb. A cut pressure and cutting start member parallels each side of the jaws and is mounted at one end thereof for pivotal motion to initiate cutting.

10 Claims, 4 Drawing Figures

PATENTED JAN 14 1975   3,859,725
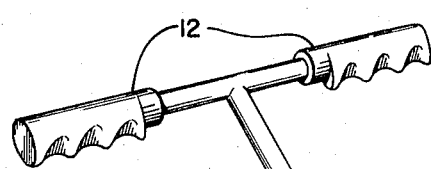
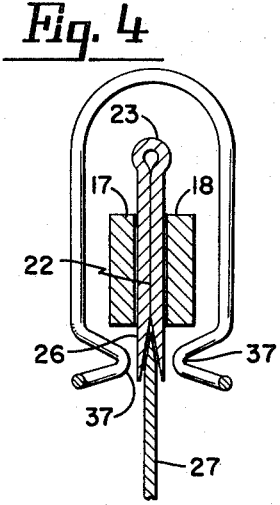
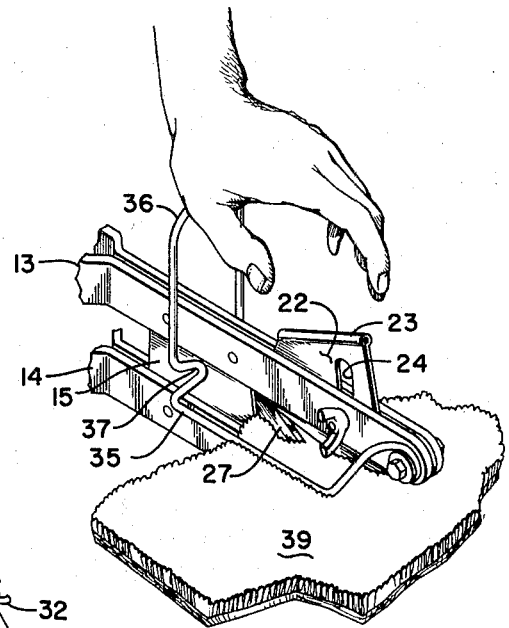
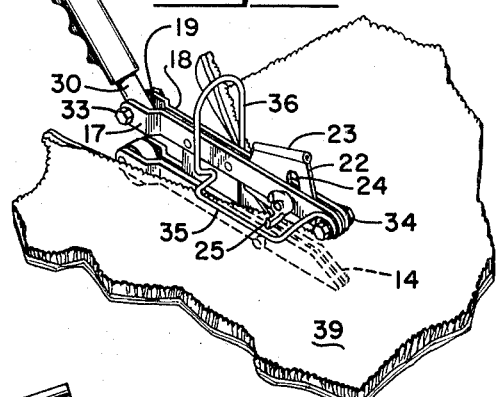
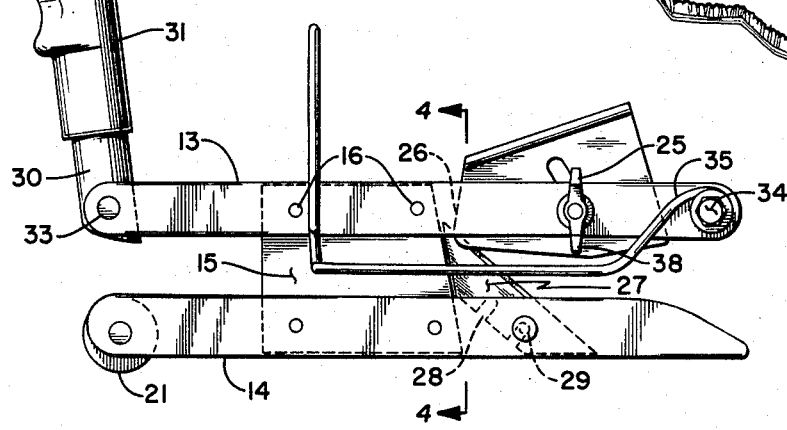

CARPET CUTTING TOOL

The present invention is directed to a manually operated cutting tool and more specifically is directed to a cutting tool suitable for hand-held operations in the cutting of carpeting and other sheet-like materials. The cutter of the invention can be used by direct handholding adjacent the cutter, from a standing position by means of a handle extension or in combination with a cutting guide as disclosed in the U.S. Pat. No. of Anderson et al., 3,772,793. In this use with a cutting guide the cutter acts as a shuttle member. Previous investigators have proposed a wide variety of cutting tools for use in cutting of carpet. However, while a large number of prior art carpet cutting tool are known which are generally of the type of the present invention each of them has had certain disadvantages in actual use. One common disadvantage present in many of the prior art cutters has been the tendency to clog the cutter due to the collection of particles of fabric at the angular intersection between the cutting blade and its mount. Another lack of the prior art cutters is the failure to provide means initiating the start of a cut. It has been found that once a cut is started into a sheet of carpeting the cut then can be continued with relatively small manual effort on the part of the operator of the cutter. However, initial force which must be applied by the operator of a cutter to start the cutting operation is much higher than the force necessary to continue a cut. This results in a jerk action at the start of the cut which tends to make the cut less true to the desired cut line than if the cut were to proceed under uniform force throughout the cutting operation. In accordance with the present invention means are provided to initiate the cut which obviate this drawback of the prior art.

In accordance with the present invention the cutting blade is extended transversely between a pair of spaced fixed cutting jaws and is inclined rearwardly from the forward opening in the jaws. A comb member is provided which adjustably extends downwardly from one jaw toward the sloped cutting edge and provides separation of the pile in the carpeting just prior to cutting so as to reduce the possibilities of the pile being cut in an undesired manner. The comb also can be adjusted to aid in applying a wedging action to force the cutting to take place. The comb member is constructed so as to have a very narrow slot adjacent the rearward portion thereof, the slot receiving a portion of the rear cutting edge of the blade holding it fixedly from wandering and at the same time markedly reducing the tendency for rug fragments to collect at the junction of the cutting blade and its mount.

In a further modification of the invention the pressure and cutting start member is pivotally mounted to the upper jaw member and extends in parallel arrangement on each side of the jaw member. By manually manipulating the pressure and starting member to pivot it about its pivot point one may controllably initiate the beginning of a cut. After the cut is begun the member provides the additional function of maintaining an outwardly applied pressure across the surface of the carpeting tending to arc the carpeting over the cutting blade to aid in its cutting and also to aid in separating the sections of carpeting as they are cut.

IN THE DRAWINGS

FIG. 1 is a perspective view partially in phantom showing one form of the tool of the invention cutting a piece of carpeting;

FIG. 2 is a perspective view of a cutter in accordance with the invention showing the cut starting operation;

FIG. 3 is a side elevational view of the cutter of FIG. 1; and

FIG. 4 is a cross-sectional view along line 4—4 of FIG. 3.

In the drawing like parts will have the same numerical designation in each of the several views. Referring now to the drawings it will be seen in FIG. 1 that 10 generally designates a hand operated cutter in accordance with the invention. As an option to the cutter there is provided an elongated rod 11 which has a T-bar at its upper end terminating in a pair of hand grips 12. Extension 11 will be utilized when it is intended to use the cutter of the invention from a standing position.

The cutter proper comprises an upper jaw 13 and lower jaw 14 which are held in spaced and fixed relationship by means of a joining plate 15. Plate 15 will desirably be of a thickness equal to or slightly greater than the thickness of the cutting blade. Plate 15 is joined to jaws 13 and 14 by appropriate means such as rivets 16. Jaw 13 is formed from two elongated metal members 17 and 18 which are offset at the rearward portion thereof to provide a handle receiving region 19. Jaw member 14 is similarly formed of two elongated strips of metal and is provided with a similar opening for receiving a rotatable wheel 21 which is journaled onto a shaft extending through the side arms of jaw 14. Plate 15 is intermediate the two halves forming jaw 13 and the two halves forming jaw 14.

Into the space between the lower members forming jaw 14 there is insertable a blade member 27 having a shape as shown in FIG. 3. An opening is provided in the side of jaw 14 for a set screw member 29 which protrudes into opening 28 in blade 27 so as to hold the blade in position. Two slots 28 are provided so that the blade can be reversed to present a second part of the cutting edge for use when the first cutting edge has become dulled. Plate 15 is desirably slightly thicker than blade 27 and abuts the back thereof to prevent rearward movement.

Through the slot between members 17 and 18 provided by the spacing effect of plate 15 there is inserted a comb member 22. Comb member 22 has an arcuate slot 24 extending therethrough. Members 17 and 18 are provided with an opening through which extends a bolt for a wing nut 25 which clamps comb 22 in desired position relative to the blade 27. Comb member 22 has the lower forward portion thereof functioning as a means of separating the pile of a carpeting prior to the carpeting reaching cutting blade 22 so as to minimize the amount of material which must be cut and to further lessen the amount of damaged edge to the carpeting. By pivotally adjusting comb 22 via slot 24 this parting action of the comb can be modified to suit particular carpeting.

The nature of comb member 22 will be seen best in FIG. 4. As is illustrated in FIG. 4, comb 22 is formed of a single piece of metal which has been doubled upon itself with the adjacent surfaces being joined by means such as spot welding. The upper bend edge 23 has a tubular configuration to lend additional stiffness to the comb. At the rearward lower portion of comb member 22 there is provided a slotted opening 26 for receiving the cutting edge of blade 27 at the upper portions thereof. This slotted opening can readily be formed by chamfering of the edges of the metal used in forming comb 22 prior to the bending operation. It is highly desirable that the opening 26 which receives the edge of blade 27 only extends between mating faces of the metal that forms the comb 22 a distance sufficient to firmly engage blade 27. Any additional distance merely increases the possibilities of the wedging of lint and cut fragments of the rug to bring about the jamming common in prior art cutters.

It can be seen that opening 26 does provide what amounts to a pivot point for rotation of member 22 within the limits permitted by slot 24. This is, the combing action of the comb 22 can be increased or decreased and rear portion 26 still engages the cutting edge of blade 27. As already noted two advantages are gained through the use of the comb. First, it provides the function of aiding in separating of the pile of the carpet where such separation is desired. It also aids in providing a compressor factor so that as the carpeting passes between the lower edge of the comb and the cutting edge it is wedged to make the cutting more effective. By adjustment the angle it forms with the cutting blade can be made either larger or smaller. It should be noted that the thickness of comb 22 is only slightly greater than blade 27. The comb should be less than twice the thickness of blade 27.

To aid in the cutting operation both as an initiator of the cut as well as during the course of a long cut there is provided a pressure and starting member 35. The form that this member takes is illustrated in the drawings as pressure bars which extend outwardly from and parallel to each side of the upper jaw member. In the specific form shown a single piece of heavy gauge spring steel wire has been bent to form a hand engaging loop 36 which stands over the top of jaw 33 with its two legs extending downwardly and then turning to form the arm members paralleling the jaw and space therefrom. At the ends of wire 35 the wire is bent inwardly and formed into loops which are pivotally joined to the upper jaw by a bolt member 34. The starting action of member 35 is best seen in FIG. 2 wherein a piece of carpeting 39 has been introduced between jaw members 13 and 14 and has been brought into contact with cutting member 27. By use of the heel of one's hand and a downward pressure at bend 36 pressure is brought to bear on the carpeting arcing it over the cutting blade thereby initiating the cut of the carpeting. Once the cut has started the amount of force necessary on the part of the operator to continue the cut is less than the starting force. However, even after the cut is initiated member 35 still aids in the cutting operation by applying pressure to the carpeting outwardly of the jaws arcing the carpeting over the blade and aiding in the cutting operation. This arcing action also tends to separate the cut edges of the carpeting.

The bolt member 34 can be utilized to fixedly position member 35 in its angular relationship to the cutting edge. That is, the bolt can be tightened so that the portion of member 35 that generally parallels the jaw members can be fixed in the desired angular relationship to blade 27 through tightening of bolt 34 so that the only movement of member 35 is that permitted by the natural spring rate of its metal. However, as a more positive means of insuring that member 35 does not pivot except when desired one can utilize the ends 38 of wing nut 25 as a stop so that as member 35 tends to pivot the arm portions will abut with edge 38 of the wing nut. This will prevent pivotal motion beyond the desired point.

A preferred form of the invention is as shown in FIGS. 2 and 4 where inwardly bent portions 37 are provided in the legs extending below the hand engaging loop 36. These inwardly bent portions 37 act as resilient stop members as they extend between the outer edges of the jaw forming members 17 and 18 and are restricted from upward movement thereby. As the force of the carpeting tends to raise member 35 in a pivotal motion about bolt 34 these bent portions 37 will engage arms 17 and 18 in a resilient manner permitted by the spring nature of the wire which forms member 35. The carpeting is thus pressured downwardly and is more readily cut by blade 27.

Various modifications can be made to the invention. For example, the rear wheels 21 which aid in passage of the cutter over the surface underlying the carpeting can be broadened so as to give a more stabilizing effect for the purposes of producing a straight cut. If desired, one can have a similar wheel at the forward end of lower jaw 14, although this has not proved to be necessary. The cutter may also be utilized in conjunction with the cutting tool guide of the above-identified U.S. Pat. No. 3,772,793. Briefly, this patent utilizes a cylindrical tube member having a slot extending along the axis thereof on one side for assistance in providing a straight cut. In such a use, the lower jaw member 14 would be inserted into the hollow of the cutting guide tool with the upper jaw riding over the surface of the carpeting and on the outside of the tube. Member 15 would aid in maintaining the cutter centered within the slot along the cutting guide tool. The balance of the cutting tool in accordance with the present invention would perform essentially in the same functional manner as already described.

What is claimed is:

1. A carpet cutting tool comprising first and second spaced jaw members defining a carpeting receiving opening therebetween, means holding said jaws in spaced relationship, a comb member adjustably joined to one of said jaw members with a portion of said comb extending into the region intermediate the jaws, said comb being adjustable so as to vary the angle its lower edge forms with said jaws, the rear portion of said comb which extends into said jaw region defining a slot along a part of the length thereof for receiving a cutting blade edge, a cutting blade mounted to at least one of said jaws and extending at least partially across said opening with the cutting edge thereof slanted rearwardly from the carpet receiving opening between said jaws, the rearward portion of the cutting edge of said blade extending into said slot in said comb.

2. A tool in accordance with claim 1 wherein said comb has a thickness less than twice that of said cutting blade.

3. A tool in accordance with claim 1 wherein said comb is formed by joining two sheets of metal in laminate arrangement and said slot is defined by a chamfered interior facing edge on said sheet.

4. A tool in accordance with claim 1 wherein said comb defines an elongated arcuate opening therein, said arcuate opening cooperating with a pin member extending therethrough and joined to said jaws for holding said comb in a predetermined angular relationship with the cutting edge of said blade.

5. A carpet cutting tool comprising upper and lower spaced jaw members defining a carpet receiving opening therebetween, means holding said jaw members in fixed and spaced relationship, a cutting blade mounted to at least one of said jaws and extending at least partially across said opening with the cutting edge thereof slanted rearwardly from the carpet receiving opening between said jaws, cut initiating means joined to the upper jaw member and extending outwardly from and generally parallel to said jaws on each side thereof adjacent said blade, said cut initiating means being mounted to said upper jaw so as to have at least the portions of said cut initiating means adjacent said blade movable independently of said upper jaw in a direction transverse to the cutting edge of said blade.

6. A tool in accordance with claim 5 wherein said cut initiating means is an elongated bar joined to said jaw at the forward end thereof, said bar being pivotally movable about its joining end through an arc intersecting said cutting edge.

7. A tool in accordance with claim 6 wherein said cut initiating means is a spring steel wire.

8. A tool in accordance with claim 7 wherein the end of said wire remote from said joining end passes over said jaw member in a loop, said loop defining a hand engaging means for pivoting said wire through an arc to initiate a cut in carpeting overlying said cutting edge.

9. A tool in accordance with claim 1 including a cut initiating means joined to the upper jaw member and extending outwardly from and generally parallel to said jaws on each side thereof adjacent said blade, and means for moving said cut initiating means in a direction transverse to the cutting edge of said blade.

10. A tool in accordance with claim 9 wherein said cut initiating means is a spring steel wire joined to the forward end of said upper jaw and curving over the upper jaw rearwardly of the cutting blade with the curved portion of said wire forming a hand engaging means for pivotally moving said wire transverse to the cutting edge through an arc so that carpeting overlying said cutting edge will be cut thereby.

* * * * *